US011984764B2

(12) United States Patent
Wang et al.

(10) Patent No.: US 11,984,764 B2
(45) Date of Patent: May 14, 2024

(54) ROTOR AND PERMANENT MAGNET MOTOR

(71) Applicant: GREE ELECTRIC APPLIANCES, INC. OF ZHUHAI, Zhuhai (CN)

(72) Inventors: Min Wang, Zhuhai (CN); Yong Xiao, Zhuhai (CN); Jinfei Shi, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 512 days.

(21) Appl. No.: 17/206,127

(22) Filed: Mar. 19, 2021

(65) Prior Publication Data

US 2021/0211004 A1    Jul. 8, 2021

Related U.S. Application Data

(63) Continuation of application No. PCT/CN2019/103973, filed on Sep. 2, 2019.

(30) Foreign Application Priority Data

Nov. 1, 2018 (CN) .......................... 201811295293.5

(51) Int. Cl.
*H02K 1/276* (2022.01)
(52) U.S. Cl.
CPC ......... *H02K 1/276* (2013.01); *H02K 2213/03* (2013.01)
(58) Field of Classification Search
CPC .... H02K 1/276; H02K 1/2766; H02K 1/2746; H02K 2213/03; H02K 2201/00
USPC .............................. 310/156.56, 156.53, 261.1
See application file for complete search history.

(56) References Cited

U.S. PATENT DOCUMENTS

| 2018/0183289 A1* | 6/2018 | Horiuchi | H02K 1/279 |
| 2019/0379248 A1* | 12/2019 | Yoon | F04B 39/0253 |
| 2020/0251944 A1* | 8/2020 | Watanabe | H02K 7/14 |

FOREIGN PATENT DOCUMENTS

| CN | 205693464 U | 11/2016 |
| CN | 106300728 A | 1/2017 |
| CN | 107196434 A | 9/2017 |
| CN | 108076676 A | 5/2018 |

(Continued)

OTHER PUBLICATIONS

Japanese Patent Office Action, Office Action Issued in Application No. 2021-514966, dated May 31, 2022, 5 pages.

(Continued)

*Primary Examiner* — Michael Andrews
(74) *Attorney, Agent, or Firm* — Kilpatrick Townsend & Stockton LLP

(57) ABSTRACT

Disclosed are a rotor and a permanent magnet motor. The rotor includes a rotor core, at least two first permanent magnets and at least two second permanent magnets. A coercivity of each first permanent magnet is different from a coercivity of each second permanent magnet, the at least two first permanent magnets and the at least two second permanent magnets are arranged in an axial direction in magnetic steel slots of the rotor core. One of the first permanent magnets and one of the second permanent magnets are arranged to be connected in series in a radial direction of the rotor core in one slot to form a permanent magnet pole. A consequent pole is formed between every two adjacent permanent magnet poles, and the permanent magnet pole forms a magnetic circuit passing through the consequent pole.

16 Claims, 3 Drawing Sheets

(56) References Cited

FOREIGN PATENT DOCUMENTS

| | | |
|---|---|---|
| CN | 109067046 A | 12/2018 |
| CN | 208955769 U | 6/2019 |
| JP | 2010004671 A | 1/2010 |
| JP | 2012125006 A | 6/2012 |
| JP | 2012244783 A | 12/2012 |
| WO | 2018158930 A1 | 9/2018 |

OTHER PUBLICATIONS

Japanese Patent Office Action, Office Action Issued in Application No. 2021-514966, dated Sep. 6, 2022, 4 pages.
State Intellectual Property Office of the People's Republic of China, First Office Action issued in Application No. 201811295293.5, Feb. 8, 2024, 13 pages.

\* cited by examiner

ROTOR AND PERMANENT MAGNET MOTOR

RELATED APPLICATION

The present application is a continuation application of the PCT application No. PCT/CN2019/103973, filed on Sep. 2, 2019, and titled "ROTOR AND PERMANENT MAGNET MOTOR", which claims the priority of Chinese Patent Application No. 201811295293.5, filed on Nov. 1, 2018, with the title of "ROTOR AND PERMANENT MAGNET MOTOR", the entire content of which is incorporated herein by reference.

FIELD

The present disclosure relates to the field of driving device technologies, more particularly, to a rotor and a permanent magnet motor.

BACKGROUND

A permanent magnet motor mainly includes a stator and a rotor. The rotor includes a rotor core and a permanent magnet. The permanent magnet is mounted in a magnetic steel slot of the rotor core. When a symmetrical three-phase current is connected to the stator, a three-phase stator current generates a rotating magnetic field in space because three phases of the stator differ in spatial positions by 120°, and the rotor in the rotating magnetic field moves under the action of the electromagnetic force, and in this case, electrical energy is transformed into kinetic energy. When the permanent magnet generates the rotating magnetic field, a three-phase stator winding induces the symmetrical three-phase current by means of an armature reaction under the action of the rotating magnetic field, and in this case, the kinetic energy of the rotor is transformed into the electrical energy.

Since the magnetic field provided by the permanent magnet of the traditional permanent magnet motor is fixed, the magnetic field inside the permanent magnet motor is difficult to adjust, so it is difficult for the permanent magnet motor to balance the efficiency at a high frequency and the efficiency at a low frequency, and the maximum operating frequency of the permanent magnet motor is limited when a power supply voltage is fixed.

SUMMARY

Based on this, a rotor and a permanent magnet motor that can balance the efficiency at a high frequency and the frequency at a low frequency are provided with respect to the problem that it is difficult for the traditional permanent magnet motor to balance the efficiency at the high frequency and the efficiency at the low frequency.

A rotor includes:
 a rotor core provided with magnetic steel slots, the magnetic steel slots being arranged at intervals on an axial end face of the rotor core in a circumferential direction of the rotor core;
 at least two first permanent magnets and at least two second permanent magnets, where a coercivity of each first permanent magnet is different from a coercivity of each second permanent magnet; the at least two first permanent magnets and the at least two second permanent magnets are arranged in an axial direction in the magnetic steel slots of the rotor core; one of the first permanent magnets and one of the second permanent magnets are arranged in series in a radial direction of the rotor core in one slot to form a permanent magnet pole;
 a circumferential part of the rotor core located between every two adjacent permanent magnet poles forms a consequent pole, and the permanent magnet pole form a magnetic circuit passing through the consequent pole.

In some embodiments, the coercivity of each first permanent magnet is less than the coercivity of each second permanent magnet, and in each of magnetic steel slots, the first permanent magnet is located on one side farther away from a center of the rotor core in the radial direction of the rotor core than a corresponding second permanent magnets is.

In some embodiments, the magnetic steel slots are uniformly arranged at intervals on the axial end face of the rotor core in the circumferential direction of the rotor core.

In some embodiments, a direction of the permanent magnet pole is arranged in the radial direction of the rotor core.

In some embodiments, the first permanent magnet and the second permanent magnet in each of magnetic slots are arranged in layers in the radial direction of the rotor core.

In some embodiments, in each of magnetic steel slots and in the circumferential direction of the rotor core, two ends of the first permanent magnet are flush with corresponding two ends of the second permanent magnet.

In some embodiments, a cross section of the permanent magnet pole is in a shape of a rectangle or is V-shaped, and the V-shaped cross section has an opening that opens outwards from the center of the rotor core.

In some embodiments, a first central angle is formed by straight lines connecting the center of the rotor core and two ends of each of the permanent magnet pole respectively, and the two ends of each of the permanent magnet pole is in the circumferential direction of the rotor core; and the first central angle is greater than $\pi/p$ and less than $1.57\pi/p$; and p is equal to half of a sum of a number of the permanent magnet poles and a number of the consequent poles.

In some embodiments, a magnetic isolation slot is provided on the axial end face of the rotor core, and the magnetic isolation slot extends in the circumferential direction of the rotor core (10) starting from two ends of the permanent magnet pole.

A permanent magnet motor is provided and includes a stator and the rotor as described above, and the rotor is rotatably sleeved in the stator.

In the rotor and the permanent magnet motor provided by the present disclosure, the permanent magnet pole is formed by the first permanent magnet and the second permanent magnet connected in series in a radial direction of the rotor core, and the magnetization degree of the permanent magnet with a low coercivity is reduced by means of the magnetizing current, thus achieving the effects that the magnetic field intensity of the permanent magnet motor is adjustable, and the permanent magnet motor balances the efficiency at the high frequency and the efficiency at the low frequency. Moreover, as the permanent magnet pole is combined with the consequent pole, when the magnetic field of the permanent magnet motor is adjusted by means of the magnetizing current, a circuit passing through the permanent magnet pole and the consequent pole is formed. No permanent magnet is arranged at the consequent pole, so the interference to the circuit is reduced, and the difficulty of magnetizing the permanent magnet with the lower coercivity is thus reduced.

Due to the existence of the consequent pole, the permanent magnet poles exist alternately, thus the number of permanent magnets is greatly reduced.

BRIEF DESCRIPTION OF THE DRAWINGS

In order to more clearly illustrate embodiments of the present disclosure, the accompanying drawings used in the description of the embodiments will be briefly introduced below. It is appreciated that, the accompanying drawings in the following description are only some embodiments of the present disclosure.

DETAILED DESCRIPTION OF THE EMBODIMENTS

Figure 1:
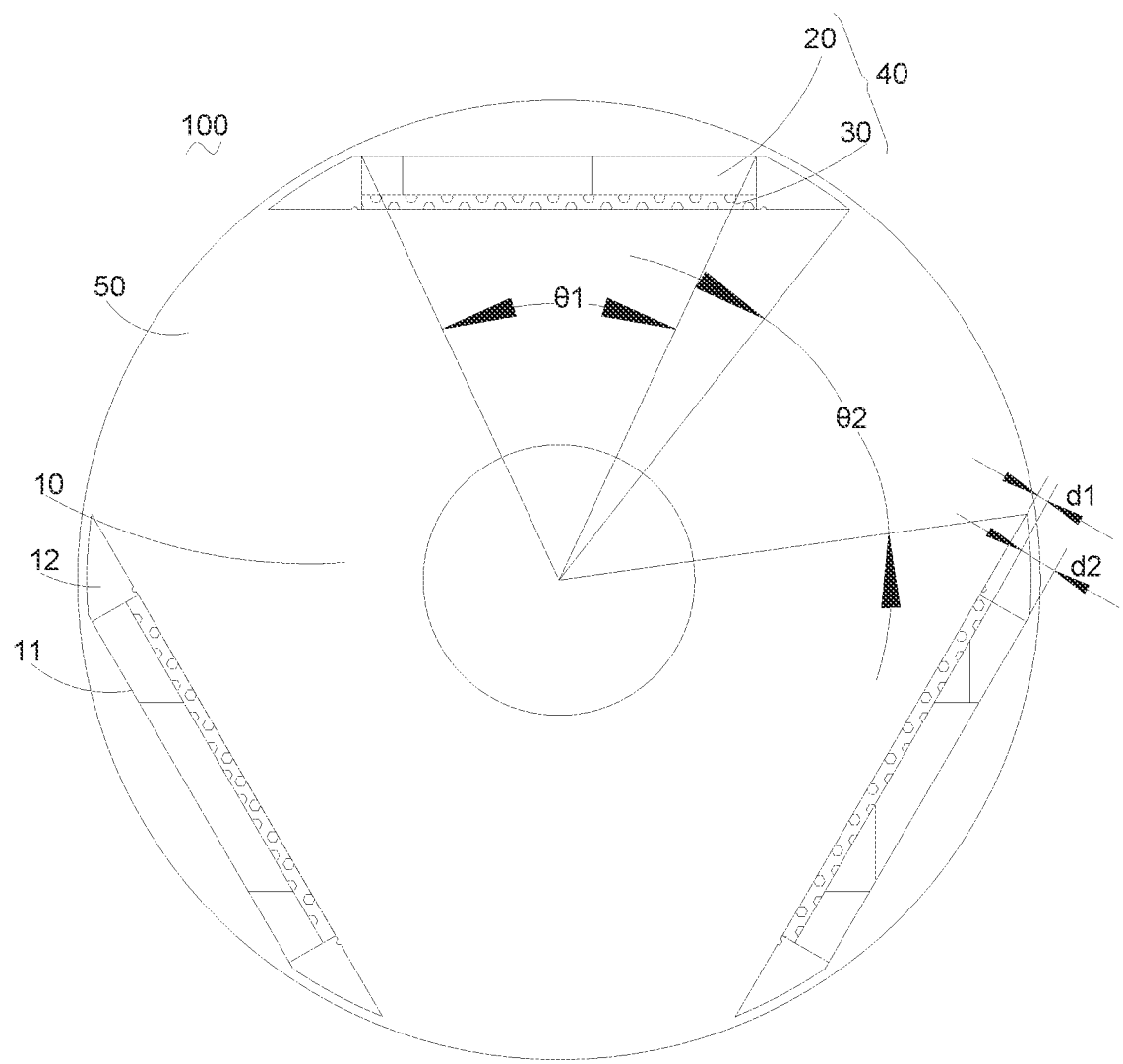
FIG. 1 is a structural diagram of a rotor according to an embodiment of the present disclosure.

To facilitate understanding of the present disclosure, a more comprehensive description of the present disclosure will be given below with reference to the relevant drawings. Some embodiments of the present disclosure are given in the drawings. However, the present disclosure may be implemented in many different forms but is not limited to the embodiments described herein. Rather, these embodiments are provided to make the contents disclosed in the present disclosure more fully understood.

It should be noted that when one element is referred to as "attached to" another element, it may be directly disposed on the other element or an intermediate element may exist. When one element is considered to be "connected to" another element, it may be directly connected to the other element or an intermediate element may co-exist. The terms "vertical", "horizontal", "left", "right" and similar expressions used herein are for illustrative purposes only.

The terms used herein in the specification of the present disclosure are for the purpose of describing specific embodiments only but not intended to limit the present disclosure. The term "and/or" used herein includes any and all combinations of one or more related listed items.

Figure 2:
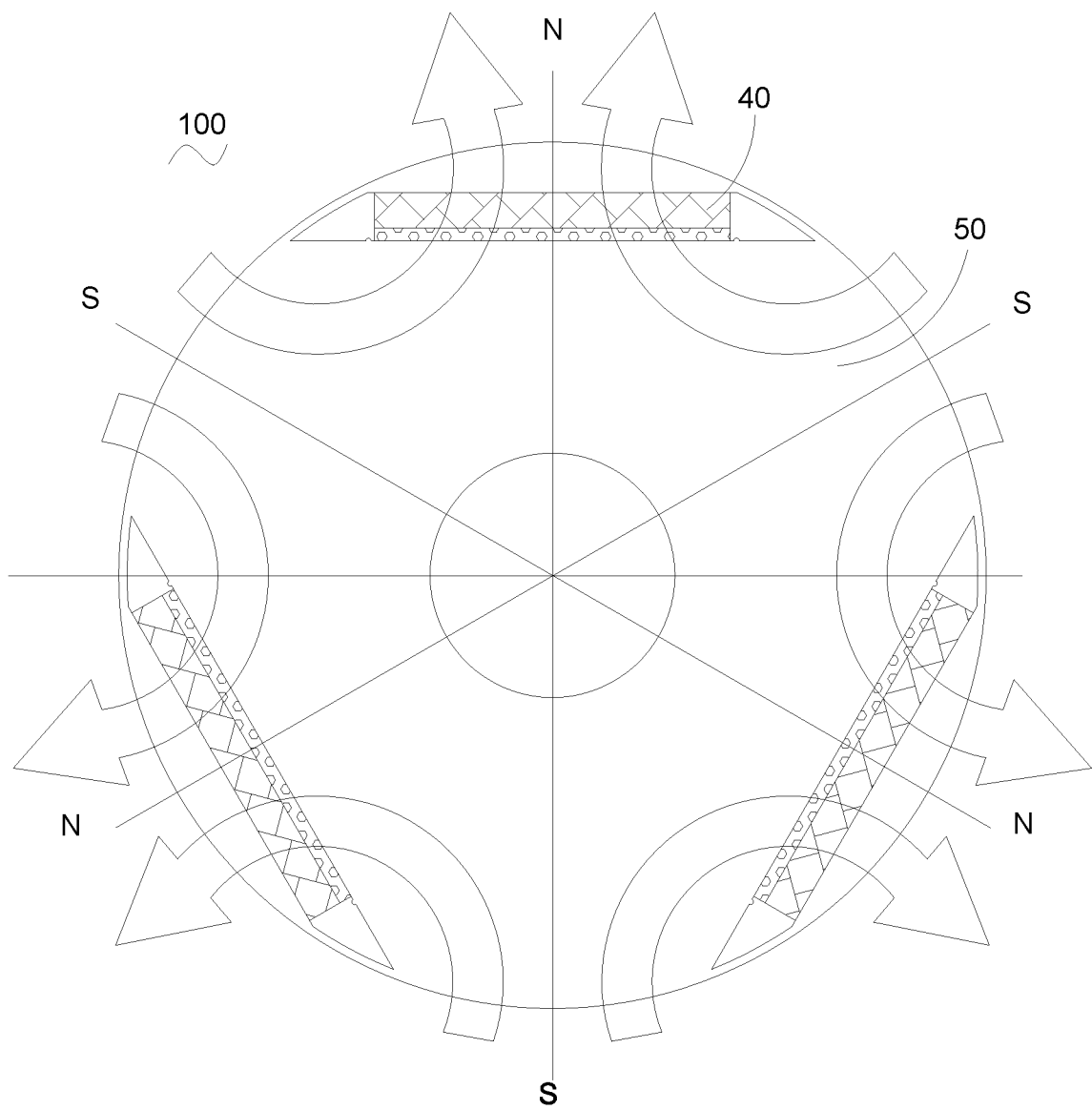
FIG. 2 is a diagram illustrating a magnetic field distribution of the rotor provided in FIG. 1.

Referring to FIG. 1 and FIG. 2, an embodiment of the present disclosure provides a permanent magnet motor, including a stator and a rotor 100. The rotor 100 is coaxially sleeved inside the stator, and there is an air gap between the rotor 100 and the stator to make it easier for the rotor 100 to rotate relative to the stator.

In an embodiment, the stator includes a stator core and armature windings. The stator core is formed by punched and pressed soft magnetic silicon steel sheets, and the teeth are circumferentially arranged at intervals inside the stator core. Each tooth is wound with an armature winding. The armature winding is electrified to generate a rotating magnetic field, which is applied to the rotor 100 to force the rotor 100 to rotate.

In an embodiment, the rotor 100 includes a rotor core 10 and permanent magnets. The rotor core 10 is formed by punched and pressed soft magnetic silicon steel sheets, and the permanent magnets are axially arranged on an axial end face of the rotor core 10. In one embodiment, the axial end face of the rotor core 10 is provided with magnetic steel slots 11, and the permanent magnets are arranged in an axial direction in the magnetic steel slots 11 of the rotor core 10.

In an embodiment, the magnetic steel slots 11 are arranged at intervals on the axial end face of the rotor core 10 in a circumferential direction of the rotor core 10.

In an embodiment, the permanent magnets include a first permanent magnet 20 and a second permanent magnet 30. A coercivity of the first permanent magnet 20 is different from that of the second permanent magnet 30, and the number of the first permanent magnets 20 is the same as that of the second permanent magnets 30 and is at least two. One first permanent magnet 20 and one second permanent magnet 30 are both mounted in one magnetic steel slot 11, and the first permanent magnet 20 and the second permanent magnet disposed in the same magnetic steel slot 11 are arranged in series in the radial direction of the rotor core 10 and jointly form a permanent magnet pole 40.

In an embodiment, a circumferential part of the rotor core 10 located between every two adjacent permanent magnet poles 40 forms a consequent pole 50 (the consequent pole 50 is formed by the part of the rotor core 10 where no permanent magnet is provided), and the permanent magnet pole 40 forms a magnetic circuit passing through a stator and the consequent pole 50.

In the permanent magnet motor provided by the present embodiment, the permanent magnet pole 40 is formed by the first permanent magnet 20 and the second permanent magnet 30 connected in series in a radial direction of the rotor core 10, and the coercivity of the first permanent magnet 20 is different from that of the second permanent magnet 30. Therefore, when the permanent magnet motor is in a low-speed and large-torque state, the permanent magnet with a low coercivity may be magnetized by a magnetizing current to become saturated, so that the magnetic field intensity inside the permanent magnet motor is enhanced to meet requirements. When the permanent magnet motor runs at a high speed and with a low torque, the magnetization degree of the permanent magnet with a low coercivity is reduced by means of the magnetizing current, so that the magnetic field intensity inside the permanent magnet motor is reduced to meet requirements. In this way, the magnetic field intensity of the permanent magnet motor is adjustable, and the permanent magnet motor balances the efficiency at the high frequency and the efficiency at the low frequency. Moreover, the first permanent magnet 20 and the second permanent magnet 30 are arranged in series along the radial direction of the rotor core 10, improving the anti-demagnetization capability of the permanent magnet with the lower coercivity. Moreover, as the permanent magnet pole 40 is combined with the consequent pole 50, when the magnetic field of the permanent magnet motor is adjusted by means of the magnetizing current, a circuit passing through the permanent magnet pole 40 and the consequent pole 50 is formed. No permanent magnet is arranged at the consequent pole 50, so the interference to the circuit is reduced, and the difficulty of magnetizing the permanent magnet with the lower coercivity is thus reduced. Due to the existence of the consequent pole 50, the permanent magnet poles 40 exist alternately, thus the number of permanent magnets is greatly reduced.

Further, in an embodiment, the magnetic steel slots 11 are uniformly arranged at intervals in the circumferential direction of the rotor core 10. Correspondingly, in the circumferential direction of the rotor core 10, the at least two first permanent magnets 20 are uniformly arranged at intervals, and the at least two second permanent magnets 30 are uniformly arranged at intervals.

In an embodiment, at least three magnetic steel slots 11 are provided. Correspondingly, at least three first permanent magnets 20 and at least three second permanent magnets 30 are also provided.

In an embodiment, the center of a shape formed by straight lines connecting centers of at least three magnetic steel slots 11 successively coincides with the center of the rotor core 10. In this case, the center of a shape formed by straight lines connecting centers of the first permanent magnets 20 mounted in the at least 3 magnetic steel slots 11 successively coincides with the center of the rotor core 10, and the center of a shape formed by straight lines connecting centers of the second permanent magnets 30 mounted in the at least 3 magnetic steel slots 11 successively also coincides with the center of the rotor core 10.

In an embodiment, the first permanent magnet 20 and the second permanent magnet 30 disposed in the magnetic steel slot 11 are arranged in layers in the radial direction of the rotor core 10, to ensure an effect of a series connection of the first permanent magnet 20 and the second permanent magnet 30.

Further, in an embodiment, for the first permanent magnet 20 and the second permanent magnet 30 located in each of magnetic steel slots 11 arranged in the circumferential direction of the rotor core 10, two ends of the first permanent magnet 20 are flush with corresponding two ends of the second permanent magnet 30, that is, the first permanent magnet 20 and the second permanent magnet 30 have a same size in the circumferential direction of the rotor core 10.

In an embodiment, cross sections of each first permanent magnet 20 and each second permanent magnet 30 arranged in the circumferential direction of the rotor core 10 each are in a shape of a rectangle cross section. In this case, the permanent magnet pole 40 formed by connecting the first permanent magnet 20 and the second permanent magnet 30 in series is in a shape of a rectangle. In this case, a shape formed by straight lines connecting centers of the at least three permanent magnet poles 40 successively is a regular polygon, and the magnetic pole direction of each permanent magnet pole 40 is in the radial direction of the rotor core 10.

In an embodiment, a first central angle θ1 is formed by straight lines connecting the center of the rotor core 10 and two ends of each permanent magnet pole 40, respectively, and the two ends of each permanent magnet pole 40 are in the circumferential direction of the rotor core 10. The first central angle θ1 is greater than π/p and less than 1.5π/p, where p is equal to half of a sum of the number of the permanent magnet poles 40 and the number of the consequent poles 50. In this case, as the magnetic field of the consequent pole 50 is provided by the magnetic field of the permanent magnet pole 40, the first central angle θ1 of the permanent magnet pole 40 may be guaranteed to be greater than a second central angle θ2 of the consequent pole 50. Where the second central angle is formed by straight lines connecting the center of the rotor core 10 and two ends of each consequent pole 50 respectively, and the two ends of each consequent pole 50 are in the circumferential direction of the rotor core 10. Thus the magnetic flux density inside the permanent magnet motor can be guaranteed, and the second central angle θ2 of the consequent pole 50 is also guaranteed to be not too small.

In an embodiment, the coercivity of the first permanent magnet 20 is less than that of the second permanent magnet 30. The first permanent magnet 20 is located on one side farther away from the center of the rotor core 10 in the radial direction of the rotor core 10 than the second permanent magnet 30 is. That is, the first permanent magnet 20 with the relatively lower coercivity is located on an outer side (one side proximate to the stator) of the second permanent magnet 30 with the relatively higher coercivity. Since a magnetism-regulating magnetic field is generated by the stator, when the first permanent magnet 20 is arranged on the outer side the second permanent magnet 30, the magnetism-regulating magnetic field may directly act on the first permanent magnet 20, which reduces the difficulty of regulating the magnetism, compared with the situation where the second permanent magnets 30 with the relatively higher coercivity is arranged on an outer side of the first permanent magnets 20 with the relatively lower coercivity (in this case, the magnetism-regulating magnetic field first acts on the second permanent magnets 30 and then on the first permanent magnets 20, and when acting on the second permanent magnets 30, the magnetic field loses).

Further, in order to ensure that the magnetizing current of the first permanent magnet 20 with the low coercivity is small, and that the permanent magnet motor may not produce demagnetization during a normal operation, a width of the first permanent magnet 20 is set to be greater than that of the second permanent magnet 30, and the dimensions of the first permanent magnet 20 and the dimensions the second permanent magnet 30 satisfy the following relational expression:

$$50 \text{ A/m} < (H1 \times d1 + H2 \times d2)/(d1+d2) < 400 \text{ A/m};$$

where d1 denotes the width of the second permanent magnet 30 with the high coercivity, d2 denotes the width of the first permanent magnet 20 with the low coercivity, H1 denotes the coercivity of the second permanent magnet 30 with the high coercivity, and H2 denotes the coercivity of the first permanent magnet 20 with the low coercivity.

Figure 3:
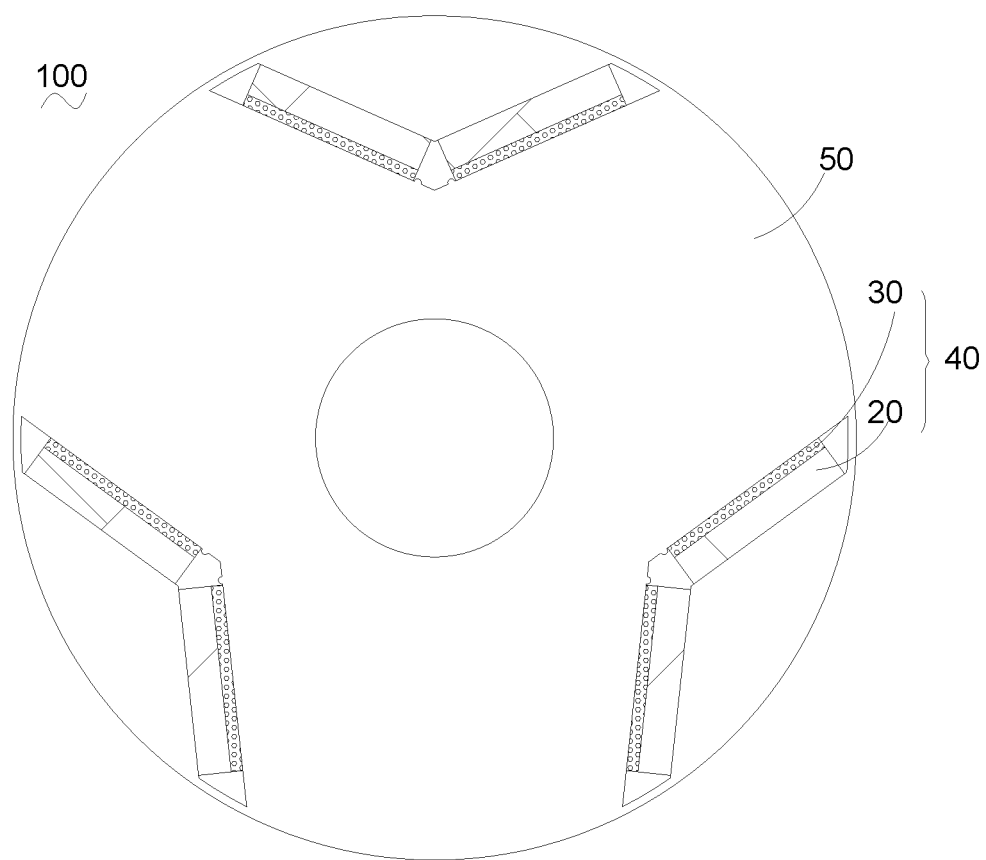
FIG. 3 is a structural diagram of a rotor according to another embodiment of the present disclosure.

Referring to FIG. 3, in another embodiment, cross sections of each first permanent magnet 20 and each second permanent magnet 30 arranged in the circumferential direction of the rotor core 10 may not be rectangular. For example, the cross section of each first permanent magnet 20 and the cross section of each second permanent magnet 30 are configured to be V-shaped, and the V-shaped cross sections each have an opening that opens outwards from the center of the rotor core 10. That is, each first permanent magnet 20 includes two parts angled relative to each other, and each second permanent magnet 30 includes two parts angled relative to each other. In this case, the permanent magnet pole 40 formed by the first permanent magnet 20 and the second permanent magnet 30 is V-shaped, which ensures that the magnetic flux density and the torque density of the permanent magnet motor are improved without changing the first central angle θ1 of the permanent magnet pole 40 according to the above embodiments.

In an embodiment, a magnetic isolation slot 12 is provided on the axial end face of the rotor core 10, and the magnetic isolation slot 12 extends in the circumferential direction of the rotor core 10 starting from two ends of the permanent magnet poles 40. The arrangement of the magnetic isolation slot 12 prevents the magnetic flux of the permanent magnet pole 40 from closing at an end thereof and reduces the magnetic leakage of the permanent magnet motor.

An embodiment of the present disclosure further provides a rotor 100 included in the permanent magnet motor described above.

The rotor 100 and the permanent magnet motor according to the embodiments of the present disclosure have the following beneficial effects:

1. The permanent magnet pole 40 is formed by the first permanent magnet 20 and the second permanent magnet 30, which are connected in series in a radial direction of the rotor core 10 and have different coercivities. When the permanent magnet motor is in a low-speed and large-torque state, the permanent magnet with a low coercivity may be magnetized by a magnetizing current to become saturated, so that the magnetic field intensity inside the permanent magnet motor is enhanced to meet requirements. When the permanent magnet motor runs at a high speed and with a low torque, the magnetization degree of the permanent magnet with the low coercivity is reduced by means of the magnetizing current, so that the magnetic field intensity inside the permanent magnet motor is reduced to meet requirements. In this way, the magnetic field intensity of the permanent magnet motor is adjustable, and the permanent magnet motor balances the efficiency at the high frequency and the efficiency at the low frequency.

2. The permanent magnet pole 40 and the consequent pole 50 are alternately arranged in the circumferential direction of the rotor core 10. Since no permanent magnet is arranged at the consequent pole 50, the difficulty of magnetizing the permanent magnet with the low coercivity is reduced. Moreover, the number of permanent magnets is greatly reduced due to the existence of the consequent pole 50.

3. In a radial direction of the rotor core 10, the first permanent magnet 20 with the low coercivity is located on an outer side of the second permanent magnet 30 with a high coercivity, and thus when magnetism needs to be regulated, a magnetism-regulating magnetic field generated by the stator acts directly on the first permanent magnet 20, which reduces the difficulty of regulating the magnetism.

The features of the above embodiments may be arbitrarily combined. For the sake of brevity, all possible combinations of the features in the above embodiments are not described. However, if there is no contradiction in the combinations of the features, the combinations shall be considered to be within the scope of the specification.

The invention claimed is:

1. A rotor, comprising:
    a rotor core provided with magnetic steel slots, the magnetic steel slots being arranged at intervals on an axial end face of the rotor core in a circumferential direction of the rotor core;
    at least two first permanent magnets and at least two second permanent magnets, wherein: a coercivity of each first permanent magnet is different from a coercivity of each second permanent magnet; the at least two first permanent magnets and the at least two second permanent magnets are arranged in an axial direction in the magnetic steel slots of the rotor core; one of the first permanent magnets and one of the second permanent magnets are arranged in series in a radial direction of the rotor core in one slot to form a permanent magnet pole;
    a circumferential part of the rotor core located between every two adjacent permanent magnet poles forms a consequent pole, and the permanent magnet pole form a magnetic circuit passing through the consequent pole;
    the coercivity of each first permanent magnet is less than the coercivity of each second permanent magnet, and in each of magnetic steel slots, the first permanent magnet is located on one side farther away from a center of the rotor core in the radial direction of the rotor core than is a corresponding second permanent magnets;
    a width of each of the first permanent magnets is set to be greater than a width of each of the second permanent magnets; and
    dimensions of each of the first permanent magnets and dimensions of each of the second permanent magnets satisfy $$50\ A/m < (H1 \times d1 + H2 \times d2)/(d1+d2) < 400\ A/m;$$

wherein d1 denotes the width of each of the second permanent magnets, d2 denotes the width of each of the first permanent magnets, H1 denotes the coercivity of each of the second permanent magnets, and H2 denotes the coercivity of each of the first permanent magnet.

2. The rotor according to claim 1, wherein the magnetic steel slots are uniformly arranged at intervals on the axial end face of the rotor core in the circumferential direction of the rotor core.

3. The rotor according to claim 2, wherein a direction of the permanent magnet pole is arranged in the radial direction of the rotor core.

4. The rotor according to claim 2, wherein the first permanent magnet and the second permanent magnet in each of magnetic slots are arranged in layers in the radial direction of the rotor core.

5. The rotor according to claim 2, wherein in each of magnetic steel slots and in the circumferential direction of the rotor core, two ends of the first permanent magnet are flush with corresponding two ends of the second permanent magnet.

6. The rotor according to claim 1, wherein a cross section of the permanent magnet pole is in a shape of a rectangle or is V-shaped, and the V-shaped cross section has an opening that opens outwards from the center of the rotor core.

7. The rotor according to claim 1, wherein a first central angle is formed by straight lines connecting the center of the rotor core and two ends of each of the permanent magnet pole respectively, and the two ends of each of the permanent magnet pole is in the circumferential direction of the rotor core; and the first central angle is greater than $\pi/p$ and less than $1.5\pi/p$; wherein p is equal to half of a sum of a number of the permanent magnet poles and a number of the consequent poles.

8. The rotor according to claim 1, wherein a magnetic isolation slot is provided on the axial end face of the rotor core, and the magnetic isolation slot extends in the circumferential direction of the rotor core starting from two ends of the permanent magnet pole.

9. The rotor according to claim 1, wherein a cross section of each first permanent magnet, and a cross section of each second permanent magnet are configured to be V-shaped, and the V-shaped cross section of each second permanent magnet and the V-shaped cross section of each first permanent magnet each have an opening that opens outwards from the center of the rotor core.

10. The rotor according to claim 1, wherein a cross section of each first permanent magnet and a cross section of each second permanent magnet are configured to be rectangular.

11. The rotor according to claim 1, wherein at least three magnetic steel slots are provided, and at least three first permanent magnets and at least three second permanent magnets are provided.

12. The rotor according to claim 11, wherein a center of a shape formed by straight lines connecting centers of the at least three magnetic steel slots successively coincides with a center of the rotor core.

13. The rotor according to claim 11, wherein a center of a shape formed by straight lines connecting centers of the at least three first permanent magnets disposed in the at least magnetic steel slots successively coincides with a center of the rotor core.

14. The rotor according to claim 11, wherein a center of a shape formed by straight lines connecting centers of the at least three second permanent magnets disposed in the at least magnetic steel slots successively coincides with a center of the rotor core.

15. The rotor according to claim 1, wherein a first central angle is formed by straight lines connecting a center of the rotor core and two ends of the permanent magnet pole, respectively; the two ends of the permanent magnet pole are in the circumferential direction of the rotor core; and the first central angle is greater than it/p and less than $1.5\pi/p$, wherein p is equal to half of a sum of a number of the permanent magnet poles and a number of the consequent poles.

16. A permanent magnet motor, comprising:
a rotor, comprising:
a rotor core provided with magnetic steel slots, the magnetic steel slots being arranged at intervals on an axial end face of the rotor core in a circumferential direction of the rotor core;
at least two first permanent magnets and at least two second permanent magnets, wherein: a coercivity of each first permanent magnet is different from a coercivity of each second permanent magnet; the at least two first permanent magnets and the at least two second permanent magnets are arranged in an axial direction in the magnetic steel slots of the rotor core; one of the first permanent magnets and one of the second permanent magnets are arranged in series in a radial direction of the rotor core in one slot to form a permanent magnet pole;
a circumferential part of the rotor core located between every two adjacent permanent magnet poles forms a consequent pole, and the permanent magnet pole form a magnetic circuit passing through the consequent pole;
the coercivity of each first permanent magnet is less than the coercivity of each second permanent magnet, and in each of magnetic steel slots, the first permanent magnet is located on one side farther away from a center of the rotor core in the radial direction of the rotor core than is a corresponding second permanent magnets;
a width of each of the first permanent magnets is set to be greater than a width of each of the second permanent magnets; and
dimensions of each of the first permanent magnets and dimensions of each of the second permanent magnets satisfy $50 \text{ A/m} < (H1 \times d1 + H2 \times d2)/(d1+d2) < 400 \text{ A/m}$;

wherein d1 denotes the width of each of the second permanent magnets, d2 denotes the width of each of the first permanent magnets, H1 denotes the coercivity of each of the second permanent magnets, and H2 denotes the coercivity of each of the first permanent magnet.

* * * * *